(No Model.) 3 Sheets—Sheet 3.
W. H. WALKER.
PHOTOGRAPHIC CAMERA.
No. 276,311. Patented Apr. 24, 1883.
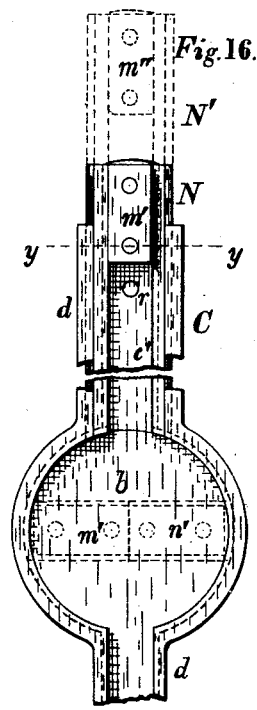
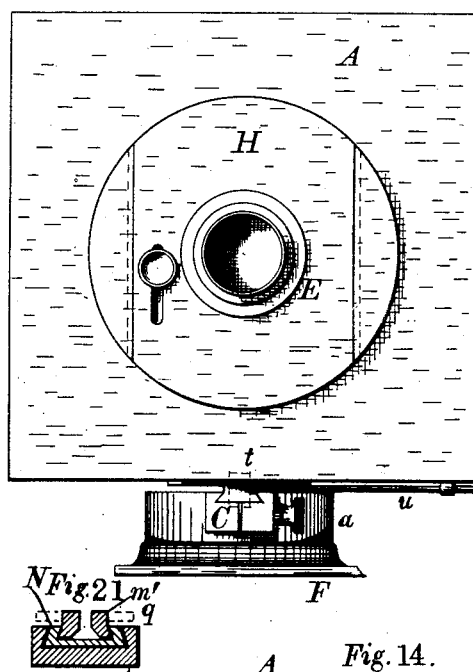
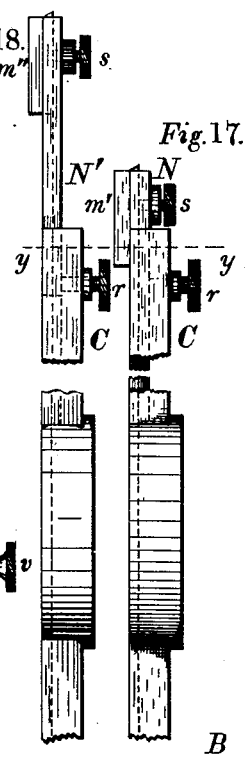
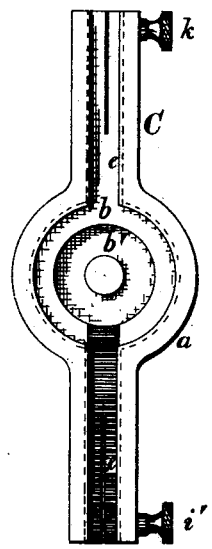
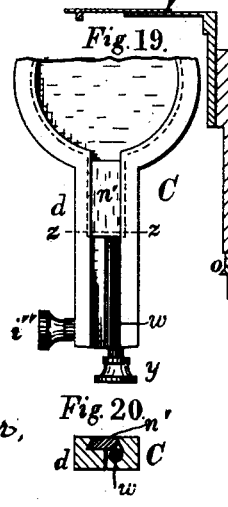
WITNESSES=
H. G. Phillips.
H. H. Schleber.
INVENTOR=
Wm. H. Walker,
By Geo. B. Selden,
atty.

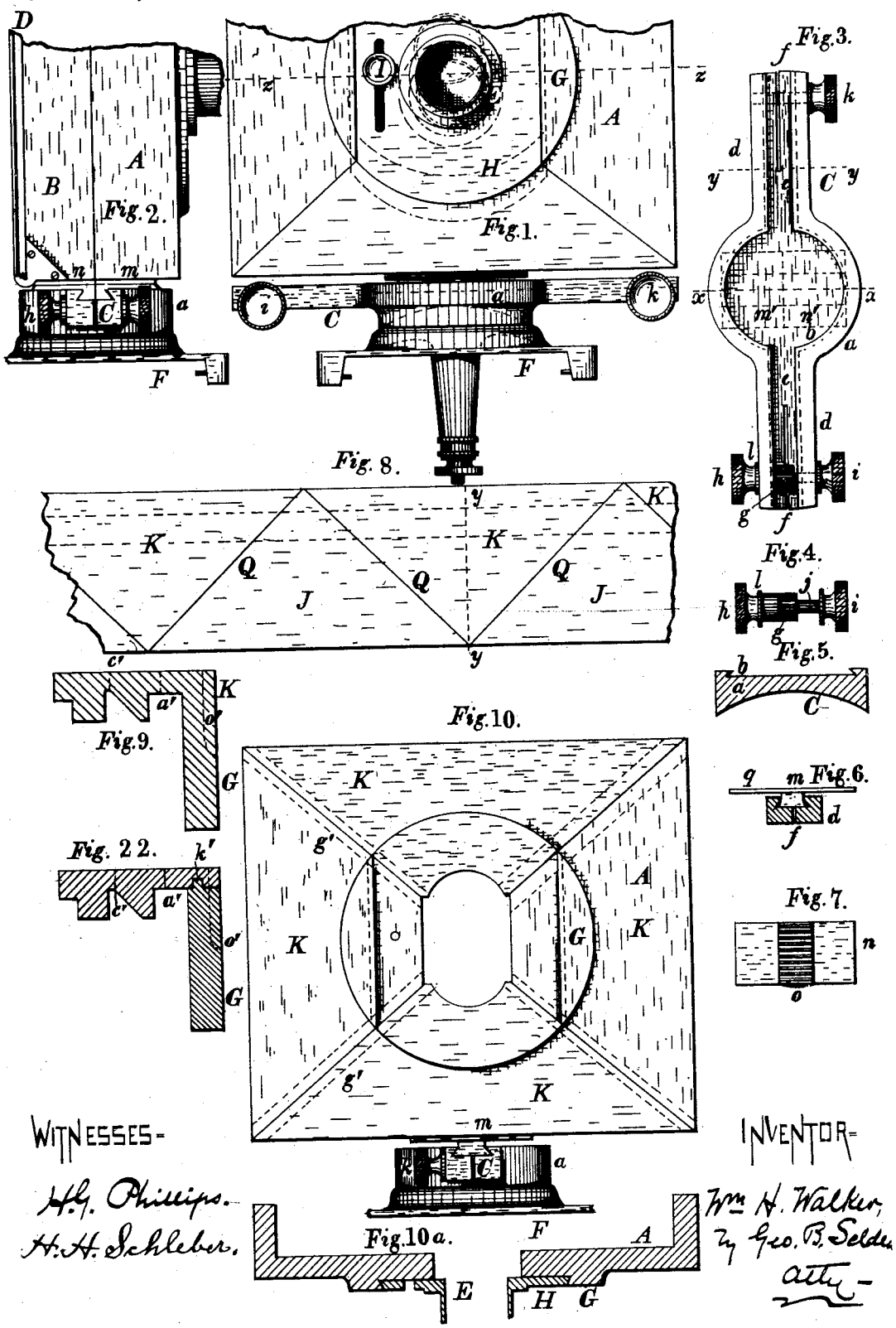

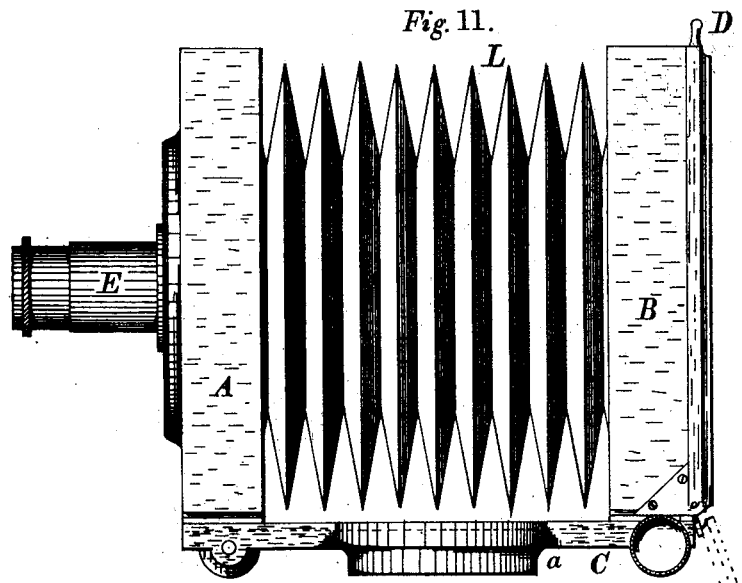
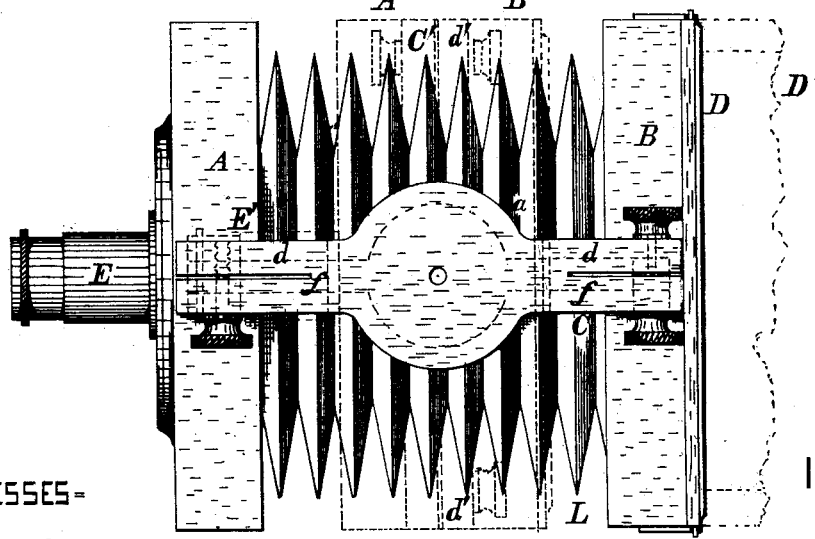

UNITED STATES PATENT OFFICE.

WILLIAM H. WALKER, OF ROCHESTER, NEW YORK, ASSIGNOR TO WILLIAM H. WALKER & CO., OF SAME PLACE.

PHOTOGRAPHIC CAMERA.

SPECIFICATION forming part of Letters Patent No. 276,311, dated April 24, 1883.

Application filed June 26, 1882. (No model.)

*To all whom it may concern:*

Be it known that I, WILLIAM H. WALKER, of Rochester, Monroe county, New York, have invented an Improved Photographic Camera, of which the following is a specification, reference being had to the annexed drawings.

Portable photographic cameras as heretofore constructed have been provided with a hinged or jointed bed, the rear portion of which was folded up in rear of the focusing screen-frame when the camera was closed. This arrangement, which also weakened the bed, prevented the camera from being closed up any more compactly than the length of the part of the jointed bed in front of the hinge.

My invention has for its object the production of a camera which, when folded up, will occupy in a direction parallel to the optical axis only the width or depth of the front and back frames combined; and it consists in providing the camera with a swivel-bed, and in the various mechanical details of the construction.

It also consists in an improved mode of forming the camera front or back from a suitable molding, all as hereinafter more fully set forth.

My improved photographic camera is represented in the accompanying drawings, in which Figure 1 is a front view of the camera when closed. Fig. 2 is a side view of the same. Fig. 3 is a plan view of the swivel-bed. Fig. 4 represents the focusing-pinion and clamping-nut. Fig. 5 is a section on the line $x\,x$, Fig. 3. Fig. 6 is a section on the line $y\,y$, Fig. 3, showing also one of the sliding blocks. Fig. 7 is an inverted view of the sliding block, which supports the back of the camera. Fig. 8 is a side view of the molding from which the camera front, back, and focusing-screen frame are constructed. Fig. 9 is a section on the line $y\,y$, Fig. 8. Fig. 10 is a front view of the camera when open, the lens and sliding front being removed. Fig. 10ª is a section on the line $z\,z$, Fig. 1. Fig. 11 is a side view of the camera when open or extended. Fig. 12 is an inverted view of the camera when open, showing the position of the parts when closed in dotted lines. Fig. 13 is a front view of the camera when open, showing a modified arrangement of the focusing-pinion. Fig. 14 is a central vertical section of the same. Fig. 15 represents the swivel-bed adapted to be used with the modified arrangement of the focusing-pinion. Fig. 16 is a plan view of the swivel-bed provided with an extension-slide. Fig. 17 is a side view of the same. Fig. 18 is a side view of the same extended. Fig. 19 is a plan view of a modification of the swivel-bed, showing focusing-screw. Fig. 20 is a transverse section of the same on the line $z\,z$, Fig. 19. Fig. 21 is a section through the swivel-bed on the line $y\,y$, Figs. 16, 17, and 18. Fig. 22 is a section through the molding, showing a modification.

In the accompanying drawings, representing my invention, A is the camera-front; B, the back; C, the swivel-bed; D, the focusing-screen frame; E, the lens; F, the tripod-head, and H, the sliding front.

L is the bellows, which is constructed in any usual way of leather or other suitable material, being attached to the interior of the front and back, as represented in Fig. 14. The bellows is attached to the front and back of the camera by applying a strip of molding along its edges, which strip is secured to the wood by tacks or screws.

The front and back of the camera are supported on the tripod-head F by means of the swivel-bed C, which consists of a circular boss or plate, $a$, provided on its opposite sides with bars $d$, Fig. 3. The boss $a$ is provided on its upper side with a circular recess, $b$, the edges of which are undercut or beveled, as represented in the sectional view, Fig. 5. The bars $d$ are provided with undercut or beveled channels $e$, which extend lengthwise along them, and are made of the same depth as the recess $b$ in the central boss, $a$. The front and back of the camera are attached to the sliding blocks $m$ and $n$, having beveled edges adapted to slide freely in the channels $e$. When the camera is opened or distended the sliding blocks occupy positions at or near the outer ends of the bars $d$, which are provided with slots $f$, so that the blocks $m\,n$ may be secured by the binding-screws $i\,k$. These screws compress the ends of the bars slightly, so as to bind the blocks in the beveled channels $e$. When the camera is closed up the blocks $m$ $n$ occupy the positions represented by the dotted lines $m'$ and $n'$ in Fig. 3. The outer ends of the sliding blocks $m$ $n$ are curved and beveled to adapt them to the shape of the edges of the recess $b$.

The construction and operation of the various parts in opening and closing the camera will be readily understood from an inspection of the inverted view, Fig. 12, in which the position of the parts when the camera is open is shown in full lines, while the position of the same parts when the camera is closed is represented in dotted lines.

In closing up the camera the front and back are moved toward each other, the blocks $m$ $n$ sliding in the channels in the bars $d$ until the front and back come in contact with each other, as represented by the dotted lines A′ B′, Fig. 12. The swivel-bed is then turned around so as to occupy a position parallel with the front and back, as represented by the dotted lines C′ $d'$, Fig. 12. The blocks $m$ $n$ are made of such a length that together they fill the recess $b$ in the center of the bars on the swivel-bed. The curved and beveled ends of the blocks $m$ $n$, projecting under the undercut edges of the recess, serve to maintain the connection between the swivel-bed and the front and back of the camera when the camera is closed. The sliding blocks may be provided with flanges $q$, as represented in full lines in Fig. 6, and in dotted lines in Fig. 21, by which they are affixed to the camera back and front; or they may be attached thereto by countersunk screws passing through the block, as indicated in Fig. 21. The curved and beveled outer ends of the blocks $m$ $n$ are represented at $o$, Figs. 7 and 14.

In order to provide for a focusing adjustment on my improved camera, the lower side of one of the sliding blocks is formed into a rack, as represented in inverted view, Fig. 7, which rack meshes with a small pinion, $g$, located in a suitable socket at or near the outer end of one of the bars $d$ of the swivel-bed. The pinion $g$ is provided with a collar, $l$, and a thumb-nut, $h$, and a threaded stem, $j$, which projects entirely through the bed and receives the binding-nut $i$.

In order to focus the image clearly on the screen, the adjustment is made by turning the thumb-nut $h$, after which the sliding block $n$ is bound in the groove by turning up the nut $i$.

In order to adapt my camera to be used with long-focus lenses, or to provide a greater range of adjustment than can be secured by the rack on the sliding block and the pinion $g$, I provide the swivel-bed C with an extension-slide, N. The extension-slide is arranged to move freely within a suitable groove formed in the swivel-bed, as represented in the sectional view, Fig. 21. By means of a binding-screw, $r$, the extension-slide may be clamped in any desired position in the groove in the swivel-bed. The extension N is provided on its upper side with an undercut groove, $e'$, which receives the sliding block $m'$, to which the front or back of the camera is attached. Provision is made for fastening the block $m'$ in position in the groove in the extension-slide by means of the clamping-screw $s$, Figs. 17 and 18. The position of the parts when extended is represented in Figs. 16 and 18 at N′ $m'$. By the use of this extension-slide the camera may be distended sufficiently to adapt it to be used with lenses of long focus.

In Figs. 14 and 15 I have represented another modification, by means of which a greater range of adjustment may be obtained than by the use of the sliding block provided with a rack, as represented in Fig. 7. In this case the bottom of the groove $e$ in the swivel-bed is provided with a rack, and the front or back of the camera is provided with a pinion, $t$, which meshes with the rack. The pinion $t$ is carried by a horizontal shaft, arranged to rotate in suitable bearings beneath the camera, and provided at its outer end with a thumb-nut, $v$. By turning the thumb-nut $v$ the pinion will be rotated and that portion of the camera to which it is affixed will be caused to slide lengthwise on the swivel-bed, thereby effecting the adjustment for focusing. The pinion is located within a suitable recess in one of the sliding blocks, and this arrangement may be employed either with or without the binding-screw $i'$, Fig. 15. When this arrangement is adopted an additional recess, $b'$, should be cut in the bottom of the recess $b$ in the central boss of the swivel-bed to permit of the turning of the block $m$, carrying the pinion $t$, therein.

In Figs. 19 and 20 I have represented another modified means of obtaining the focusing adjustment. It consists in providing the swivel-bed C with a screw, $w$, arranged lengthwise of one of the bars, and arranged to mesh with a suitable nut on the bottom or side of the sliding block $n'$. The screw $w$ may, if preferred, extend the whole length of the bar $d$, and provision should be made by means of suitable collars or journals to prevent end-play in the screw. The screw is provided with a thumb-nut, $y$, outside of the end of the swivel-bed, and this arrangement may be used with or without the binding-screw $e''$, Fig. 19.

In order to provide for adjusting the focusing-screen at an angle with the optical axis of the camera, the camera-back B may be attached to the sliding block $m$ by any suitable form of joint.

Any usual or preferred form of plate-holder may be used in connection with my improved swivel-bed camera.

My improved swivel-bed my be used in connection with any ordinary flat-headed tripod, in which case the lower side of the bed will be provided with a plane surface and a screw for affixing it to the tripod; or the central boss may be provided with a curved surface in order to adapt it to be used with a tripod-head having a convex upper surface in the manner represented in my previous patent, No. 259,064, dated June 6, 1882.

The front and back of my improved camera may be constructed of wood or other suitable material in any usual or preferred way. I have, however, invented an improved mode of constructing these parts whereby I am enabled to materially cheapen the cost of their production.

My improved mode of constructing camera backs and fronts consists in the employment of a right-angled molding of a form substantially as shown in sectional view, Fig. 9. I employ a molding of this form in convenient lengths, and by the use of a miter-box or other suitable device I divide the molding into triangular sections on the diagonal lines Q Q, Fig. 8, rejecting each alternate piece J J. The inclination and distance apart of the lines Q Q may be proportioned so as to produce sections K K adapted to the construction of cameras of any desired size. If it is desired to produce a small camera, the sections K K will be of equal size, and if the intention is to construct an oblong camera two of the sections K K will be cut longer than those which form the ends of the camera. The camera-body is formed by joining four of the triangular pieces K together at their edges by any suitable form of joint. The diagonal sides of those triangular pieces are preferably joined by a tongue and groove, as represented by the dotted lines $g'$ in Fig. 10. The box or frame thus formed is then divided parallel to the front of the camera on the line $a'$ $c'$, Fig. 9, that portion to the right hand of the line $a'$ in said figure forming the camera-front, the portion between the lines $a'$ and $c'$ forming the back, and the remaining portion to the left hand of the line $c'$ in said figure constituting the frame D for the focusing-screen. This method of construction possesses the following advantages: I am enabled to use the same form of molding for all sizes of cameras, it materially reduces the number of pieces employed in the construction of a camera, and cameras thus constructed posses great strength, while they may be produced at a very much reduced cost.

In order to provide for the adjustment of the vertical position of the lens on the front of my improved camera, I form a raised panel, G, thereon by cutting away the outer surface thereof on the dotted lines $o'$, Fig. 9. The panel G may be either round or square, and through it is formed a vertical groove, in which the plate H, carrying the lens E, slides.

Instead of forming the molding from which my improved camera-body is constructed in one piece, it may be formed in two pieces, jointed together in any suitable fashion, as represented at $k'$, Fig. 22.

It is obvious that various modifications of my improved swivel-bed may be adopted without departing from the principle of the invention. Thus the camera front and back may be attached to the swivel-bed by mechanical devices other than the sliding blocks, and various other changes may be introduced in the construction of the camera; but my invention will be embodied under any change of form in all cameras in which the bed swivels so as to occupy, when the camera is closed, a position substantially parallel with the front and back, thereby insuring the utmost completeness and portability.

It is obvious that a camera provided with my improved swivel-bed may be made reversible by placing sliding blocks on both the sides and bottom of the camera front and back.

I claim—

1. In combination with a photographic camera, the swivel-bed C, substantially as described.

2. The combination of the camera front and back A and B, bellows L, swivel-bed C, and sliding blocks $m$ and $n$, substantially as described.

3. The combination, with a photographic camera, of the swivel-bed C, sliding block $n$, and mechanism for effecting the adjustment for focusing, substantially as described.

4. In combination with a photographic camera, the swivel-bed C, provided with the extension-slide N, substantially as described.

5. The combination, with a photographic camera, of the swivel-bed C, focusing-screw $w$, and sliding block $n'$, substantially as described.

6. The combination of the camera front and back A and B, bellows L, swivel-bed C, sliding blocks $m$ and $n$, and means for securing the sliding block in place on the bed, substantially as and for the purposes set forth.

7. The herein-described photographic camera, consisting of a bed, C, bellows L, and relatively-adjustable front A and back B, either or both being formed by the union by their oblique edges of sections cut from a suitable angular molding, substantially as and for the purposes set forth.

WM. H. WALKER.

Witnesses:
GEO. B. SELDEN,
H. G. PHILLIPS.